United States Patent
Cartier et al.

(10) Patent No.: US 6,267,902 B1
(45) Date of Patent: Jul. 31, 2001

(54) PROCESS FOR REMOVING A COATING FROM A HOLE IN A METAL SUBSTRATE

(75) Inventors: Thomas Joseph Cartier, Scotia; D. Sangeeta, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/211,484

(22) Filed: Dec. 15, 1998

(51) Int. Cl.⁷ .................................................. C23F 1/00
(52) U.S. Cl. .................. 216/2; 216/65; 216/102
(58) Field of Search .............. 216/65, 96, 101, 216/102, 2; 427/255, 555, 556; 219/121.69

(56) References Cited

U.S. PATENT DOCUMENTS

| | | | |
|---|---|---|---|
| 4,134,777 | 1/1979 | Borom | 134/2 |
| 4,141,781 | 2/1979 | Greskovich et al. | 216/101 |
| 4,327,134 * | 4/1982 | Baldi | 427/253 |
| 4,836,858 | 6/1989 | Reinhart | 134/1 |
| 4,838,989 * | 6/1989 | Ashby et al. | 216/87 |
| 4,904,498 * | 2/1990 | Wu | 427/556 |
| 4,965,095 * | 10/1990 | Baldi | 427/142 |
| 5,419,971 * | 5/1995 | Skelly et al. | 428/612 |
| 5,576,069 * | 11/1996 | Chen et al. | 427/454 |
| 5,643,474 | 7/1997 | Sangeeta | 216/96 |
| 5,662,762 | 9/1997 | Ranalli | 156/344 |

* cited by examiner

Primary Examiner—Gregory Mills
Assistant Examiner—A C Powell
(74) Attorney, Agent, or Firm—Noreen C. Johnson; Douglas E. Stoner

(57) ABSTRACT

A method of removing a coating from the surface of a hole in a metal-based substrate is described. The coating is scored on or near the surface of the hole. The substrate is then treated with a coating-removal solution under conditions suitable for removing the coating without damaging the substrate or any intervening bond layer. The coating is often a zirconia-based thermal barrier coating. In such a case, a caustic solution is used to remove the coating within an autoclave. The substrate can be a component of a turbine engine.

30 Claims, 2 Drawing Sheets

Micrograph of Laser Scored TBC Showing Melting and Cracking of TBC Around the Scored Reggion Optical Photograph of Laser Scored TBC Blade Micrograph of Laser Scored TBC Showing Melting and Cracking of TBC Around the Scored Reggion

PROCESS FOR REMOVING A COATING FROM A HOLE IN A METAL SUBSTRATE

BACKGROUND OF THE INVENTION

This invention relates to methods for removing coatings from metal substrates. More specifically, it relates to the removal of coatings from the area within and around holes in the substrate.

Metal alloy components which are exposed to high temperatures (e.g., about 1000° C.–1100° C.) need to be protected from the potentially damaging effects of such an environment. Turbine engine components are but one example. Various techniques have been devised to maintain the temperature of the engine components below critical levels. One approach calls for the incorporation of internal cooling channels or "passage holes" in the component, through which cool air is forced during operation of the engine. For example, the holes may extend from the cooler surface of an airfoil to a "hot" surface which is exposed to the elevated temperatures. Cooling air (usually provided by the engine's compressor) is fed through the holes from the cooler surface to the hot surface. As long as the holes remain clear, the rushing air will assist in lowering the temperature of the hot metal surface and preventing melting or other degradation of the component.

The high temperature components are also frequently covered by specially-formulated protective coatings. These coatings, often referred to as thermal barrier coatings or "TBC's", effectively increase the operating temperatures of the alloys. Many of the protective coatings are ceramic-based, e.g., based on a material like zirconia (zirconium oxide). The coatings are frequently applied over an intervening bond layer, like those formed of aluminide, platinum aluminide, MCrAlY (where "M" is usually iron, nickel, or cobalt), or similar types of metallic coatings. When the TBC and the bond layer are heat-treated, a thin interlayer of alumina is formed between the substrate and the bond layer. (The TBC and the bond layer are sometimes collectively referred to herein as the "TBC system".)

When a protective coating on an engine component becomes worn or damaged, it must be carefully repaired, since direct exposure of the underlying substrate to excessive temperature may eventually cause the component to fail and damage other parts of the engine. The periodic overhaul of the TBC system usually involves complete removal of the TBC, followed by re-coating with fresh TBC. If the bond layer has been damaged, it is also removed and replaced. However, repeated removal of the bond layer is usually not permissible because of detrimental effects to the component, e.g., thinning of the component walls.

Various methods have been used to remove the TBC layer for eventual re-coating. Examples include grit blasting, water-jet treatment and caustic autoclave treatment. While such techniques are often effective for removing the TBC, there are sometimes problems associated with their use. For example, these techniques sometimes fail to remove the TBC from the passage holes. Moreover, even if the TBC is removed from the holes, the aggressive character of these removal techniques can damage the bond layer. They can also damage the substrate, "eating" into its thickness and thereby changing critical dimensions of the component. There are other drawbacks to some of the techniques. For example, grit-blasting is a labor-intensive and time-consuming process which detracts from the efficiency of TBC overhaul.

In U.S. Pat. No. 5,643,474 of D. Sangeeta, a wet chemical process for removing TBC coatings from the surface of a metal alloy component is described. The process involves treating the coated surface in an autoclave with an organic caustic solution. Temperature, pressure and time conditions are specifically maintained to completely remove the TBC without damaging the underlying bond layer or substrate surface.

The process in the Sangeeta patent is very effective for removing TBC material from flat and contoured surfaces. However, it is sometimes not as effective at removing the TBC material from the inner surface of cooling passage holes in the component, or from the component surface immediately adjacent the hole, i.e., at the "rim" of the hole. The interlayer of alumina between the TBC and the bond layer may be removed, but residual TBC material often remains in the hole. This TBC residue, which may adhere to the sides of the hole because of compressive stresses in the TBC, must be removed by an additional step, e.g., a mechanical technique which loosens the residue. However, the additional step may detract from the overall efficiency of the process.

Thus, new techniques for completely removing any type of a coating, such as (but not limited to) a TBC, from holes would be a useful addition to this area of technology. The techniques should be efficient and not labor-intensive. They should also preserve the integrity of the metal alloy surface and any bond layer remaining on the surface during the coating repair stage.

SUMMARY OF THE INVENTION

The needs discussed above have been satisfied by the discovery which forms the basis for the present invention. In a primary embodiment, the invention is a method for removing at least one coating from the surface of a hole (e.g., a passage hole) in a metal-based substrate, comprising the steps of:

(a) scoring the coating on the surface of the hole or on the substrate surface adjacent the hole; and then (b) treating the substrate with a coating-removal solution under temperature, pressure, and time conditions suitable for removing the coating without damaging the substrate. The coating is often a zirconia-based TBC, applied over an intervening bond layer, as described above. In such an instance, treatment with the coating-removal solution usually is carried out in a pressure vessel, such as an autoclave.

The scoring is usually carried out by directing a laser beam across the hole, or across a region of the surrounding substrate surface which is less than about 125 microns from the rim of the hole. The scoring step does not damage the substrate or any bond layer which might be applied directly over the substrate. In some of the embodiments in which a laser is used, it is of the neodymium-YAG (yttrium-aluminum-garnet) type. In other embodiments of the invention, ultraviolet (UV) and visible (VIS) lasers may be used.

The composition of the coating-removal solution depends on the composition of the coating. When the coating is a ceramic-based material like a TBC, the coating-removal solution is usually a caustic composition, as further described below. Caustic compositions of this type usually comprise a base and water, and optionally, an organic compound.

The substrate being treated according to this invention often contains a row or array of holes covered by the coating. As further described below, the process is effective for removing the coating from the interior of the holes, as well as from the surrounding surface of the substrate. A method for repairing a damaged coating on a substrate which contains holes is also described. The method uses the treatment described above, and enhances the overall repair process.

Further details regarding the features of this invention are found in the remainder of the specification.

DETAILED DESCRIPTION OF THE INVENTION

Figure 1:
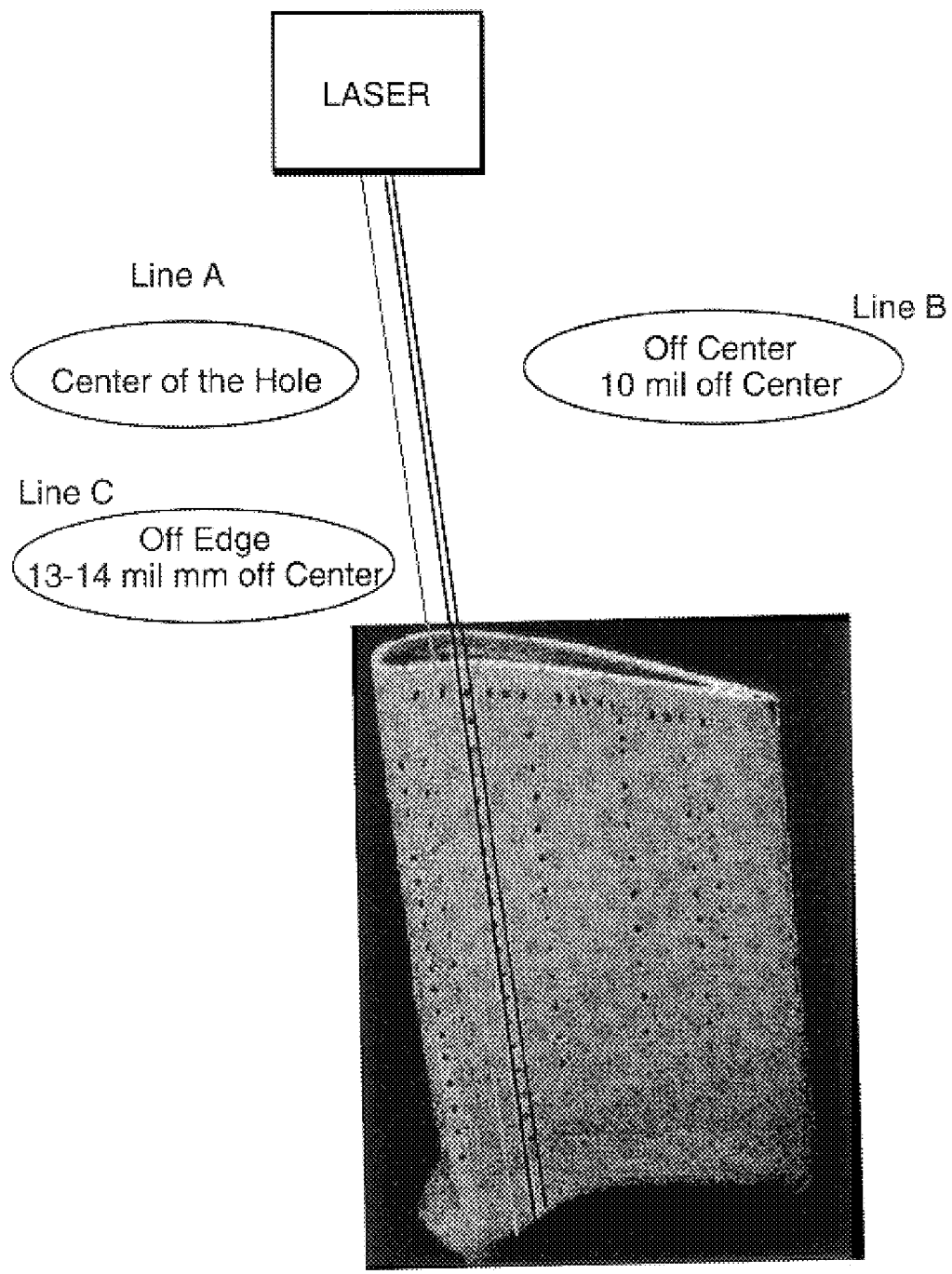
FIG. 1 is a photograph of a thermal barrier-coated airfoil containing passage holes, and further illustrated with laser-lines of contact for scoring the airfoil surface.

The method of the present invention can be used to remove of variety of coatings from holes which extend into or through substrates formed of any metallic material or alloy. Very often, the substrate is formed from a heat-resistant alloy designed for high-temperature environments. As defined herein, "metal-based" refers to substrates which are primarily formed of metal or metal alloys, but which may also include some non-metallic components, e.g., ceramics, intermetallic phases, or intermediate phases. Many of the heat-resistant materials are referred to as "superalloys", and they typically have an operating temperature of up to about 1000–1150° C. . (The term "superalloy" is usually intended to embrace complex cobalt- or nickel-based alloys which include one or more other elements such as aluminum, tungsten, molybdenum, chromium, titanium, and iron.) Superalloys are described in various references, such as U.S. Pat. Nos. 5,399,313 and 4,116,723, both incorporated herein by reference. Illustrative nickel-base alloys are designated by the trade names Inconel®, Nimonic®, Rene® (e.g., Rene®80-, Rene®95 alloys), and Udimet®. While the type of substrate can vary widely, it is often in the form of a jet engine part, such as the combustor liner or combustor dome, buckets, nozzles, blades, or vanes of a turbine engine.

The holes which are in the substrate usually extend from one surface to another surface, and may constitute a variety of shapes. Very often—especially when used as cooling passageways in some sort of engine part—most of the holes are substantially circular, thus having a cylindrical shape through the body of the substrate. The diameter of the holes is often in the range of about 5 mils (127 microns) to about 500 mils (1.27 cm). In some embodiments, the diameter is in the range of about 5 mils (127 microns) to about 100 mils (0.25 cm). The holes may be substantially perpendicular to the substrate surface, or they may be situated at an angle, e.g., at least about 10 degrees relative to a horizontal outer surface. This orientation of the holes will of course depend on their function. When they are used as cooling passageways in an engine part, they are often situated at an angle in the range of about 20 degrees to about 80 degrees relative to the horizontal outer surface. Moreover, the depth of the hole for that type of end use (i.e., the "length" of a hole if it is situated at an angle) is usually in the range of about 50 mils (1270 microns) to about 700 mils (1.78 cm). There are usually about 50 to about 120 holes per square-inch of the substrate surface.

The coatings which can be removed according to this invention can be polymer-based, ceramic-based, or metallic-based, for example. In the case of turbine engine components, oxide- or ceramic-based protective coatings (i.e., TBC's) such as zirconium oxide are usually applied over the entire hot surface, as mentioned previously. Various techniques can be used for deposition, such as physical vapor deposition (PVD) or air plasma spray (APS), both of which are well-known in the art. Chemically-stabilized coatings are often used, such as yttria-stabilized zirconia, calcia-stabilized zirconia, magnesia-stabilized zirconia, and mixtures thereof. These types of protective coatings are frequently applied over an intervening bond layer, which is frequently metal-based. Exemplary bond layers are aluminum, platinum-aluminum, aluminum-nickel, nickel-chromium-aluminum-yttrium, iron-chromium-aluminum-yttrium, cobalt-chromium-aluminum-yttrium, and nickel-cobalt-chromium-aluminum-yttrium.

The bond layer usually has a thickness in the range of about 50 microns to about 500 microns, and most often, in the range of about 50 microns to about 375 microns. In general, the thickness of the TBC is in the range of about 75 microns to about 1500 microns, and most often, in the range of about 75 microns to about 300 microns. For holes within the general dimensions provided above, the TBC and the bond layer (as applied by PVD or APS) usually cover (depth-wise) at least about 20 mils (508 microns) of the interior walls of the holes, as measured from the rim of the hole. More often, the coatings cover at least about 10 mils (254 microns) of the interior walls.

In the first step of the claimed process, the coating on the surface of the hole is scored. Usually, a laser is used to score the surface. UV or IR (infrared) lasers may be used, as well as visible-light lasers. Lasers suitable for the present invention are well-known in the art and described in many sources, such as *The Condensed Chemical Dictionary*, 10th Edition, B. Hawley, Van Nostrand Reinhold Company Inc., 1981; the *Encyclopedia Americana*, Vol. 16, 1981, Grolier, Inc., pp. 763a et seq.; and *Kirk-Othmer's Encyclopedia of Chemical Technology*, 4th Edition, Vol. 15, pp. 1–50, all of which are incorporated herein by reference. Some specific examples of types of lasers include insulating-solid lasers, semiconductor junction lasers, gas lasers (e.g., carbon dioxide types), chemical lasers, and liquid lasers. In general, the laser should emit light with an absorbing wavelength that provides a power density of greater than about $10^5$ watts/$cm^2$. When the wavelength is in the UV region, the power density is usually in the range of about $10^5$ watts/$cm^2$ to about $10^6$ watts/$cm^2$. When the wavelength is in the visible region, the power density is usually in the range of about $10^7$ watts/$cm^2$ to about $10^8$ watts/$cm^2$. When the wavelength is in the IR region, the power density is usually in the range of about $10^7$ watts/$cm^2$ to about $10^9$ watts/$cm^2$.

In preferred embodiments, insulating-solid lasers (sometimes referred to as "insulating-crystal" lasers) are used for scoring. They may be operated on a continuous basis or a pulse basis, with a pulse basis usually being chosen. Those of skill in the art understand that selection of laser power (i.e., laser power density or "intensity"), laser focus, frequency, current, and travel speed will depend on a variety of factors, such as the type of laser equipment being employed; as well as the type and thickness of the coatings being scored. When the laser intensity is relatively high, the laser beam may not need to be as focused as when the laser intensity is lower, as long as the coating is sufficiently scored, as discussed below. Sometimes, a laser-absorbing coating is applied to the surface of the coating being scored, to enhance absorption of the laser energy.

Insulating-crystal lasers emit in the visible-light or near-infrared range. They are usually cooled far below room temperature during operation, and often require optical pumping. A rare-earth element such as neodymium is often used as a dopant in crystals employed in these types of lasers. Various crystalline "hosts" for the rare earth dopant may be used. Yttrium-aluminum-garnet (YAG) is often the crystal of choice. Glass doped with the rare-earth element may be an alternative to the crystal-doped types. Lasers based on the glass-doped technology may also be within the scope of this invention. Other details regarding laser instrumentation and related features (e.g., pumping details, amplification, oscillation, and the like) are also known in the art and do not need to be provided in detail here.

As briefly mentioned above, the laser beam is passed along the substrate surface which contains the hole (or array of holes), under conditions sufficient to score the hole. As used herein, "scoring" generally refers to providing an indentation in the coating. Usually, the indentation extends to a depth of about 10% to about 90% of the thickness of the coating. As an example, when the thickness of the TBC is in the range of about 50 microns to about 200 microns, scoring is usually carried out to a depth of about 10 microns to about 150 microns. The scoring does not contact the substrate, and in preferred embodiments, does not contact the underlying bond layer.

Usually, the laser focus is targeted on the center of the hole, which will result in the laser beam contacting at least a portion of the interior surface of the hole. However, it has been discovered that the beneficial effect of the laser scoring can be obtained without the beam contacting the center of the hole. In other words, the beam can contact any region "off-center" of the hole (and within the hole). In fact, in some embodiments, the laser beam does not have to contact the hole at all. Instead, the beam can be directed to the coated substrate surface near the rim of the hole, i.e., at a distance less than about 10 mils (254 microns) from the rim of the hole, and preferably, less than about 5 mils (127 microns) from the rim of the hole. The present inventors have discovered that, surprisingly, scoring of the substrate surface in the general vicinity of the hole still results in total removal of the coating from the interior of the hole, after the other steps of the process are carried out.

The speed of the laser across the substrate will depend on many of the factors set forth above, e.g., coating type and thickness, laser-type, and laser intensity. For example, a higher laser intensity allows for higher laser-travel speeds across the substrate. Very often, the laser is computer-controlled, e.g., by the use of a robotic system. In some embodiments, lasers which are often employed to drill passage holes in a metal substrate can be readily modified to score the substrate according to this invention.

In the presently-described process, the scoring step ablates the coating material (e.g., the TBC) to some degree, and it also melts (or at least partially melts) the coating. In preferred embodiments (and especially in the case of ceramic coatings), the ablation/melting action converts the microstructure of the coating in the scored region from a substantially porous microstructure which is often columnar, to a substantially dense microstructure which is often monolithic. In terms of adhesion to the underlying bond layer, the coating becomes mechanically weakened, and can therefore be removed easily when the remainder of the process is carried out. (As used herein, the "scored region" generally refers to the coating region which is within about 100 microns of the indentation. However, the exact area of this region may vary somewhat, depending on laser type and intensity; coating type, and related factors.).

After the coating on the substrate has been scored, the substrate is treated with a solution or mixture which is capable of removing the coating without damaging the substrate. (For simplicity, the removing-substance will be referred to hereinafter as a "solution".) If the coating is polymer-based, the coating-removal solution is usually a solvent which is capable of dissolving the polymer. Those skilled in the polymer arts would be able to select an appropriate solvent (along with temperature and time conditions) for a given polymer or copolymer without undue effort. The substrate is usually immersed in the solution. However, other means for contact can be employed. For example, the solution can be poured, sprayed or brushed onto the substrate surface until the coating is removed.

If the coating is metal-based, the coating-removal solution is usually an acid or an acidic solution. Those of ordinary skill in the metallurgical and/or chemical arts are familiar with compositions which will effectively dissolve (etch away) particular metals. The most appropriate composition can be selected without undue effort. The substrate is usually immersed in the acid, although other means of contact are possible, as mentioned above.

When the coating is oxide- or ceramic-based (e.g., a protective coating such as zirconium oxide), the coating-removal composition is preferably a caustic solution. A variety of aqueous or non-aqueous caustic solutions may be employed. Some of them are described in U.S. Pat. No. 5,643,474, which is incorporated herein by reference. Many of them are organic, and comprise a mixture of water and a basic compound, such as a hydroxide base.

Non-limiting examples of the basic compounds include sodium hydroxide, potassium hydroxide, ammonium hydroxide, tetramethylammonium hydroxide, lithium hydroxide, and triethylamine. Mixtures which comprise two or more of such compounds could also be utilized. Various other additives which reduce surface tension may also be present in the caustic solution, such as conventional surfactants and chelates.

The weight ratio of base to water in the caustic solution may range from about 30:70 to about 45:55. The overall concentration of the base in the caustic solution may range from very dilute, e.g., about 5 wt. %, to very concentrated, e.g., about 65 wt. %, based on total weight of the caustic solution.

In some embodiments of the invention, the caustic solution further includes an organic compound. The organic compound is usually one which reduces the surface tension of the solution. Non-limiting examples include alcohols such as methanol, ethanol, propanol, and isopropyl alcohol; as well other compounds, such as acetone, liquid carbon dioxide, or liquid ammonia. Mixtures of two or more of any of these compounds can also be used. The amount of organic compound will depend on various factors, such as the type and thickness of the coating being removed; as well as the size of the substrate and the size of the pressure vessel. (Those skilled in the art understand that the organic compound may sometimes be a "basic compound" as well, e.g., tetramethylammonium hydroxide. In such an instance, an additional organic compound is contemplated for this embodiment).

For a caustic solution which comprises the three components mentioned above, the base is usually present at a level of about 5% by weight to about 65% by weight; the water is usually present at a level of about 5% by weight to about 80% by weight; and the organic compound is usually present at a level of about 1% by weight to about 98% by weight. In some preferred embodiments, the base is present at a level of about 10% by weight to about 25% by weight; the water is present at a level of about 15% by weight to about 30% by weight; and the organic compound is present at a level of about 45% by weight to about 75% by weight. Adjustment of the relative amounts of water, base, and the organic compound can be carried out by observing the effect of particular mixtures on coating removal from the substrate surface and the hole surface.

The substrate is usually treated with the caustic solution in a pressure vessel. A variety of pressure vessels may be employed. One type which is often used is the autoclave, a device built to withstand high temperatures, as well as high pressure. Pressure in the autoclave is elevated by heating the reaction mixture contained therein, or by using an external source of compressed gasses to over-pressurize the vessel. The autoclave may be operated in a batch fashion, or in a continuous or semi-continuous fashion.

The temperature and pressure levels in the autoclave may cause the organic component of the caustic solution to become a supercritical fluid, or to have properties similar to that of a supercritical fluid. In other words, the surface tension of the fluid is zero, or approaches zero, which allows the fluid to completely wet the surface with which it comes into contact. It is not critical for the organic component to be a supercritical fluid in the presently disclosed process. However, if the organic component approaches such a state in the autoclave during treatment of the coated substrate, the consequential decrease in surface tension appears to increase the activity of the caustic solution, thereby enhancing its wettability toward fine cracks and pores.

In the relevant embodiment, the substrate is treated with the caustic solution (usually by immersion therein) under temperature, pressure, and time conditions sufficient for removing the coating which covers at least a portion of the surface of the hole, without damaging the substrate. Moreover, in some embodiments, the selected treatment conditions are those which will remove a TBC in the hole without substantially affecting any underlying bond layer. The previous scoring of the coating greatly increases the ability of the caustic treatment to remove coating material from the hole area.

Temperature and pressure levels within the pressure vessel, as well as treatment time (i.e., reaction time), can vary. Some of the factors involved in selecting these parameters are the amount and type of coating being removed; the operating capabilities of the vessel; and the particular type of caustic solution being employed. As an example, the pressure in the vessel can range from about 100 psi to about 3000 psi. The temperature is usually in the range of about 175° C. to about 250° C., but can be as low as about 150° C. Higher pressures and temperatures may be used to achieve shorter process times. As another alternative, the treatment can be initiated at zero pressure, while increasing the temperature of the reaction mixture. The increase in temperature causes an increase in pressure within the vessel as the vapor pressure of the reaction mixture is increased.

The time required for removal of the coating from the substrate surface and the holes will depend on the type of coating and the amount of coating requiring removal, as well as the temperature and pressure conditions employed. When using a caustic solution in an autoclave, the time is usually between about 5 minutes and about 60 minutes, and most often, between about 10 minutes and about 30 minutes. The use of agitation, e.g., a mixer, at low pressure or high pressure, may sometimes enhance the ability of the caustic solution to remove the coating, and may increase the speed of removal. Exemplary types of agitation include the use of a mechanical stirrer, a magnetic stirrer, or an ultrasonicator.

After the substrate has been treated with the coating-removal solution, it is usually washed with water or another appropriate substance, e.g., an organic solvent, and then dried. In the typical case of ceramic coatings, the substrate is removed from the pressure vessel (after the vessel pressure and temperature are returned to ambient conditions). The substrate is then usually cleaned with water, followed by an acid wash (e.g., using hydrochloric acid or acetic acid) to neutralize any leftover base. The substrate can be washed again in water, and dried by any convenient method, e.g., in an oven. The surface of the substrate can then be re-coated with a coating (e.g., a TBC) by any known technique.

Another embodiment of this invention is directed to a method for repairing a damaged coating applied over a substrate which includes at least one hole extending into the substrate, wherein the surface of the hole is at least partially covered with the coating, comprising the following steps:

(i) removing the damaged coating from the substrate and the hole surface by (A) scoring the coating on the surface of the hole or on the substrate surface adjacent the hole; and then (B) treating the substrate with a coating-removal solution under temperature, pressure, and time conditions suitable for removing the coating without damaging the substrate; and then (ii) applying additional coating material over the substrate.

As described previously, the substrate is frequently a component of a turbine engine, and the coating being removed in that case is usually a TBC. In such an instance, scoring is often carried out with a laser, while the coating-removal solution is usually a caustic composition which contacts the substrate within a pressure vessel. The ability of such a process to effectively remove the TBC from the hole surface greatly enhances the efficiency of the repair process. The repair technique can also be used with the other types of coatings described above.

EXAMPLES

The following examples are merely illustrative, and should not be construed to be any sort of limitation on the scope of the claimed invention.

Example

In this example, the substrates were airfoils formed from a nickel-base superalloy. (Both new-make airfoils and airfoils previously in use were treated). The substrate had been grit-blasted and then physical vapor-deposited with a variety of bond coats (bond layers): pack aluminide; pack platinum-aluminide; vapor-platinum aluminide; vapor aluminide; and slurry-aluminide. The thickness of the bond coat in each instance was about 50–250 microns. A standard, yttria-stabilized zirconia thermal barrier coating was then applied by physical vapor deposition over the bond coat, to a thickness of about 50–250 microns.

As shown in FIG. 1, the substrate contained a number of columns of holes which extended through its thickness. The holes had an average diameter of about 0.51 mm. Many of them were inclined, e.g., at an angle of about 20 degrees relative to the surface of the substrate, although some of them were substantially vertical to the substrate surface. The holes in each column were spaced at various distances from each other. In general, the spacing ranged from about 2 to 5 mm.

A neodymium-YAG laser was used to score the holes. The laser was operated at a power level of 40 watts, on a pulse basis. The laser intensity was about $10^9$ watts/cm$^2$. The laser beam was passed through at least three different columns of holes to score them. In each instance, the speed of the laser across the column of holes was about 4–12 inches per minute (10.2–30.5 cm per minute). (In additional runs, the laser speed was varied, as set forth in the table below). In the first run, the laser beam was passed through the center of each hole in the row, i.e., across the largest diameter of the hole. In the second run, the laser beam was passed through an imaginary line 10 mils (254 microns) off-center of each hole, while still contacting the interior of each hole. In the third run, the laser beam was passed through an imaginary line about 13–14 mils (330–356 microns) off-center of each hole, i.e., about 75–100 microns from the rim of each hole. In each case, the laser-scoring did not damage the bond coat or the underlying substrate.

FIG. 1 is a photograph of a thermal barrier-coated airfoil containing passage holes. The figure has been illustrated with laser-lines of contact for scoring the airfoil surface, according to the present invention. Line A is depicted as crossing the center of many of the passage holes in the column, while line B is depicted as crossing the edge (rim) of many of the holes, i.e., about 10 mils (250 microns) off-center of the hole. Line C is depicted as crossing points which are farther away from the edge of many of the holes, i.e., about 13–14 mils (330–356 microns) off-center of the hole.

Figure 2:
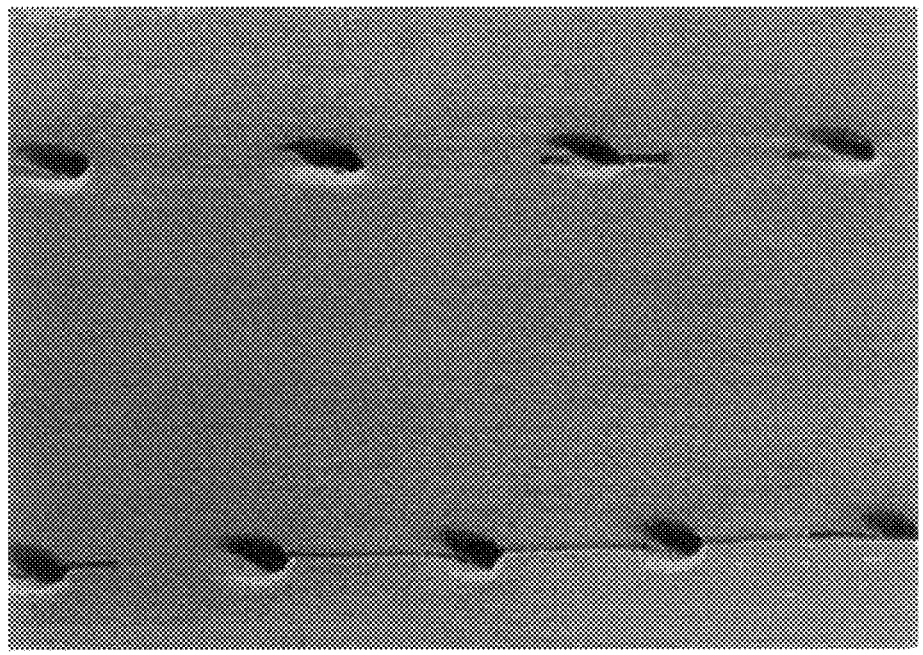
FIG. 2 is a magnified, optical photograph of a laser-scored airfoil surface.
Figure 3:
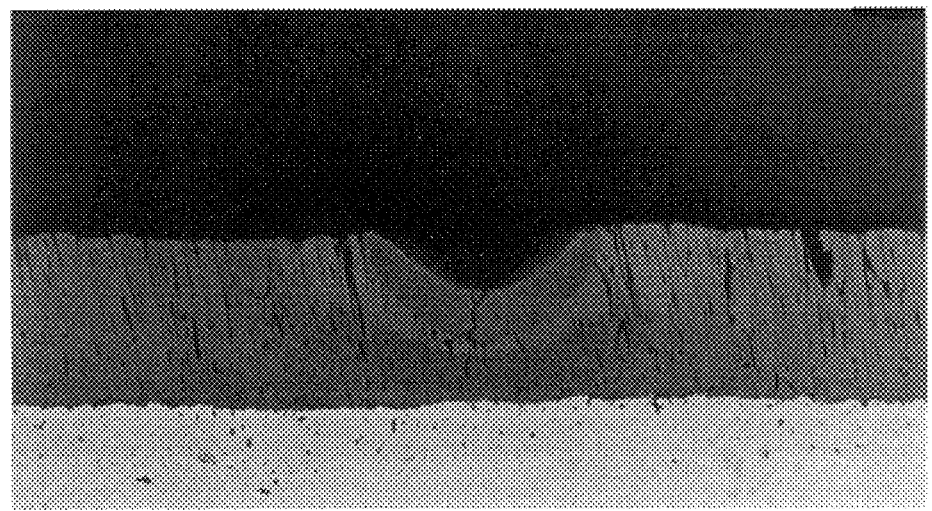
FIG. 3 is a micrograph of a laser-scored protective coating on an airfoil surface.

FIG. 2 is an optical photograph of a portion of the substrate in which laser scoring was carried out by directing the beam through the center of a row (i.e., the column) of holes. FIG. 3 is a micrograph of a cross-section of a scored substrate. Melting and cracking of the TBC around the scored region is evident. In that region, the coating has been changed from a columnar, substantially porous microstructure to a monolithic, substantially dense microstructure with cracks.

A caustic solution containing (by weight) 15% NaOH, 25% water, and 60% ethanol was stirred until the solution became clear. The substrates were placed in the autoclave, which was then filled with the caustic solution. The autoclave was sealed and pressurized to 1000 psi, using nitrogen as the pressurizing gas. After the autoclave was checked to ensure that no leakage of gas was occurring, the temperature was raised to 230° C., which resulted in a pressure increase to 750 psi. These conditions were maintained for about 30 minutes.

The substrates were removed after the autoclave was brought to room temperature and the pressure was released. The samples were cleaned by rinsing (or in some instances, by ultrosonicating) in a mixture of water and acetic acid. (Some additional samples were rinsed with deionized water, and then neutralized with acetic acid to remove any residual NaOH.)

Inspection of the substrates showed that, in general, the TBC was completely removed from the interior of each hole (in the columns of holes which had been scored), as well as from the surfaces which surrounded the holes. Moreover, there was no damage (e.g., gouging, corrosion, pitting, or intergranular attack (IGA)) of the bond coat or the underlying substrate. This result is in marked contrast to prior art methods for removing protective coatings. Those techniques either failed to completely remove the coatings, or damaged the bond coat during the removal process.

The following table provides a summary of results for some of the variations in the process described above:

TABLE

| Laser Scoring Location* | Laser Speed (cm/min.) | Amount of TBC Removed (%)** |
|---|---|---|
| 0 | 20.3 | 100.0 |
| 254 | 20.3 | 100.0 |
| 330 | 20.3 | 100.0 |
| 0 | 12.2 | 100.0 |
| 254 | 12.2 | 100.0 |
| 254 | 28.4 | 81.8 |

*Distance from passage hole, in microns.
**Each run represents the average of 6–10 data points.

The above results show that the present process is effective at removing the TBC, even when scoring contacts the area outside the hole, i.e., on the surrounding substrate surface. The laser speed should be adjusted to provide for sufficient contact of the beam with the TBC, as described previously. As mentioned above, the laser beam should be focused to effectively score the TBC.

Although this invention has been shown and described with respect to some of the preferred embodiments, it will be understood by those skilled in the art that various changes in form and detail thereof may be made without departing from the spirit and scope of the claimed invention.

All of the patents, articles, and texts mentioned above are incorporated herein by reference.

What is claimed:

1. A method for removing a coating from the surface of a hole located within the surface of a metal-based substrate, comprising the steps of:
   (a) scoring the coating on the surface of the hole or on the substrate surface adjacent the hole; and then
   (b) treating the substrate with a coating-removal solution under temperature, pressure, and time conditions sufficient to remove the coating without damaging the substrate.

2. The method of claim 1, wherein the scoring of step (a) provides an indentation in the coating to a depth of about 10% to about 90% of the thickness of the coating.

3. The method of claim 2, wherein the coating is ceramic-based, and the microstructure of the coating adjacent the indentation is substantially dense after the coating has been scored.

4. The method of claim 1, wherein the scoring does not contact the substrate.

5. The method of claim 1, wherein the scoring is carried out by directing a laser beam across the hole or across the substrate surface adjacent the hole.

6. The method of claim 5, wherein the hole includes a rim at the substrate surface, and the laser beam is directed across the substrate surface at a distance of less than about 254 microns (10 mils) from the rim of the hole.

7. The method of claim 5, wherein the source of the laser beam is a laser operating at a power density of greater than about $10^5$ watts/cm$^2$.

8. The method of claim 5, herein the laser is of the yttrium-aluminum-garnet (YAG) type.

9. The method of claim 5, wherein the laser is of the neodymium-YAG type.

10. The method of claim 1, wherein the coating is ceramic-, polymer-, or metallic-based.

11. The method of claim 10, wherein the ceramic-based coating comprises zirconia.

12. The method of claim 11, wherein the ceramic-based coating is a chemically stabilized zirconia-based coating selected from the group consisting of yttria stabilized zirconia, calcia stabilized zirconia, magnesia stabilized zirconia, and mixtures thereof.

13. The method of claim 10, wherein the coating is ceramic-based, and step (b) is carried out by immersing the substrate in a caustic solution.

14. The method of claim 13, wherein the caustic solution comprises water and a basic compound.

15. The method of claim 14, wherein the caustic solution further comprises an organic compound.

16. The method of claim 15, wherein the organic compound is a solvent selected from the group consisting of methanol, ethanol, propanol, isopropyl alcohol, acetone, liquid carbon dioxide, liquid ammonia, and mixtures thereof.

17. The method of claim 14, wherein the basic compound is selected from the group consisting of sodium hydroxide, potassium hydroxide, lithium hydroxide, ammonium hydroxide, triethylamine, tetramethylammonium hydroxide, and mixtures thereof.

18. The method of claim 13, wherein the caustic solution is contained in a pressure vessel.

19. The method of claim 18, wherein the pressure vessel is an autoclave.

20. The method of claim 18, wherein the pressure is in the range of about 100 psi to about 3000 psi.

21. The method of claim 18, wherein the temperature in the pressure vessel is about 150° C. or greater.

22. The method of claim 18, wherein the time period in the pressure vessel is between about 5 minutes and about 60 minutes.

23. The method of claim 1, wherein the coating is polymer-based, and the coating-removal solution comprises a solvent which is capable of dissolving the polymer.

24. The method of claim 1, wherein the coating is metal-based, and the coating-removal solution comprises an acid or acidic solution which is capable of removing the coating.

25. The method of claim 1, wherein the substrate contains more than one hole covered by the coating, and at least a portion of the total number of holes is treated according to steps (a) and (b) to remove the coating.

26. The method of claim 1, wherein a bond layer is disposed between the substrate and the coating.

27. The method of claim 26, wherein the coating is removed without removing or damaging the bond layer.

28. The method of claim 1, wherein the metal-based substrate is a superalloy.

29. The method of claim 1, wherein the metal-based substrate is a component of a turbine engine.

30. A method for repairing a damaged coating applied over a substrate which includes at least one hole extending into the substrate, wherein the surface of the hole is at least partially covered with the coating, comprising the following steps:

(i) removing the damaged coating from the substrate and the hole surface by
   (A) scoring the coating on the surface of the hole or on the substrate surface adjacent the hole; and then
   (B) treating the substrate with a coating-removal solution under temperature, pressure, and time conditions suitable for removing the coating without damaging the substrate; and then (ii) applying additional coating material over the substrate.

* * * * *